(12) United States Patent
Shin et al.

(10) Patent No.: US 12,393,223 B2
(45) Date of Patent: Aug. 19, 2025

(54) LIGHT CONTROL FILM AND DISPLAY DEVICE INCLUDING THE SAME

(71) Applicant: Samsung Display Co., LTD., Yongin-si (KR)

(72) Inventors: Hyun Eok Shin, Yongin-si (KR); Ju Hyun Lee, Yongin-si (KR); Joon Yong Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/297,763

(22) Filed: Apr. 10, 2023

(65) Prior Publication Data
US 2023/0367364 A1 Nov. 16, 2023

(30) Foreign Application Priority Data
May 16, 2022 (KR) .................. 10-2022-0059795

(51) Int. Cl.
*G06F 1/16* (2006.01)
*G02F 1/00* (2006.01)
*G02F 1/01* (2006.01)

(52) U.S. Cl.
CPC .......... *G06F 1/1601* (2013.01); *G02F 1/0063* (2013.01); *G02F 1/0102* (2013.01); *G02F 2201/08* (2013.01); *G02F 2202/02* (2013.01)

(58) Field of Classification Search
None
See application file for complete search history.

(56) References Cited

U.S. PATENT DOCUMENTS

| | | | | |
|---|---|---|---|---|
| 2020/0328257 A1* | 10/2020 | Kim | ..................... | H10K 59/123 |
| 2020/0357871 A1* | 11/2020 | Chung | ................. | H10K 59/879 |
| 2021/0223440 A1* | 7/2021 | Wang | ................ | G02F 1/134309 |

FOREIGN PATENT DOCUMENTS

| | | |
|---|---|---|
| CN | 1744784 | 3/2006 |
| KR | 10-2015-0076000 | 7/2015 |
| KR | 10-2020-0081911 | 7/2020 |
| KR | 10-2021-0074641 | 6/2021 |

* cited by examiner

*Primary Examiner* — Stephen T. Reed
(74) *Attorney, Agent, or Firm* — KILE PARK REED & HOUTTEMAN PLLC

(57) ABSTRACT

A light control film includes a first light absorbing layer, a first organic layer disposed on the first light absorbing layer, and a second light absorbing layer disposed on the first organic layer. At least one of the first light absorbing layer and the second light absorbing layer includes a first layer including a metal oxide, a second layer disposed on the first layer and including a metal, and a third layer disposed on the second layer and including a metal oxide.

23 Claims, 10 Drawing Sheets

LIGHT CONTROL FILM AND DISPLAY DEVICE INCLUDING THE SAME

CROSS-REFERENCE TO RELATED APPLICATION(S)

This application claims priority to and the benefits of Korean Patent Application No. 10-2022-0059795 under 35 U.S.C. § 119, filed on May 16, 2022, in the Korean Intellectual Property Office (KIPO), the entire contents of which are incorporated herein by reference.

BACKGROUND

1. Technical Field

The disclosure relates to a light control film and a display device including the same.

2. Description of the Related Art

Flat display devices include a liquid crystal display (LCD), a plasma display panel (PDP), an organic light emitting diode (OLED) device, a field effect display (FED), an electrophoretic display device, and the like.

The display device is used in various electronic devices such as a mobile phone, a navigation device, a digital camera, an electronic book, a portable game machine, and various terminals.

The above information disclosed in this Background section is only for enhancement of understanding of the disclosure, and therefore it may contain information that does not form the prior art that is already known in this country to a person of ordinary skill in the art.

SUMMARY

Embodiments are to provide a light control film and a display device including the same in which, with a simple manufacturing process, so that a time and cost required for the process are reduced.

According to an embodiment of the disclosure, a light control film may include a first light absorbing layer, a first organic layer disposed on the first light absorbing layer, and a second light absorbing layer disposed on the first organic layer. At least one of the first light absorbing layer and the second light absorbing layer may include a first layer including a metal oxide, a second layer disposed on the first layer and including a metal, and a third layer disposed on the second layer and including the metal oxide.

The metal oxide may include at least one of copper, molybdenum, and tantalum.

The second layer may include at least one of copper, molybdenum, aluminum, and titanium.

Each of the first layer and the third layer may include a copper oxide, and the second layer may include copper.

Each of the first layer and the third layer may include a molybdenum tantalum oxide, and the second layer may include at least one of molybdenum, aluminum, and titanium.

A thickness of each of the first layer and the third layer may be greater than or equal to about 450 angstroms.

The thickness of each of the first layer and the third layer may be in a range of about 550 angstroms to about 650 angstroms.

A thickness of the second layer may be greater than or equal to about 500 angstroms.

An absorption coefficient of each of the first layer and the third layer may be greater than or equal to about 0.5.

The absorption coefficient of each of the first layer and the third layer may be greater than or equal to about 0.7.

The light control film may further include a second organic layer disposed on the second light absorbing layer, and a third light absorbing layer disposed on the second organic layer.

According to an embodiment of the disclosure, a display device may include a display panel, and a light control film overlapping the display panel in a plan view. The light control film may include a first light absorbing layer, a first organic layer disposed on the first light absorbing layer, and a second light absorbing layer disposed on the first organic layer. At least one of the first light absorbing layer and the second light absorbing layer may include a first layer including a metal oxide, a second layer disposed on the first layer and including a metal, and a third layer disposed on the second layer and including the metal oxide.

According to the embodiments, it is possible to provide, since a manufacturing process thereof is simple, a light control film in which a time and cost required for the process are reduced. In addition, it is possible to provide a display device including a light control film and effectively reduce reflectance.

DETAILED DESCRIPTION OF THE EMBODIMENTS

Figure 1:
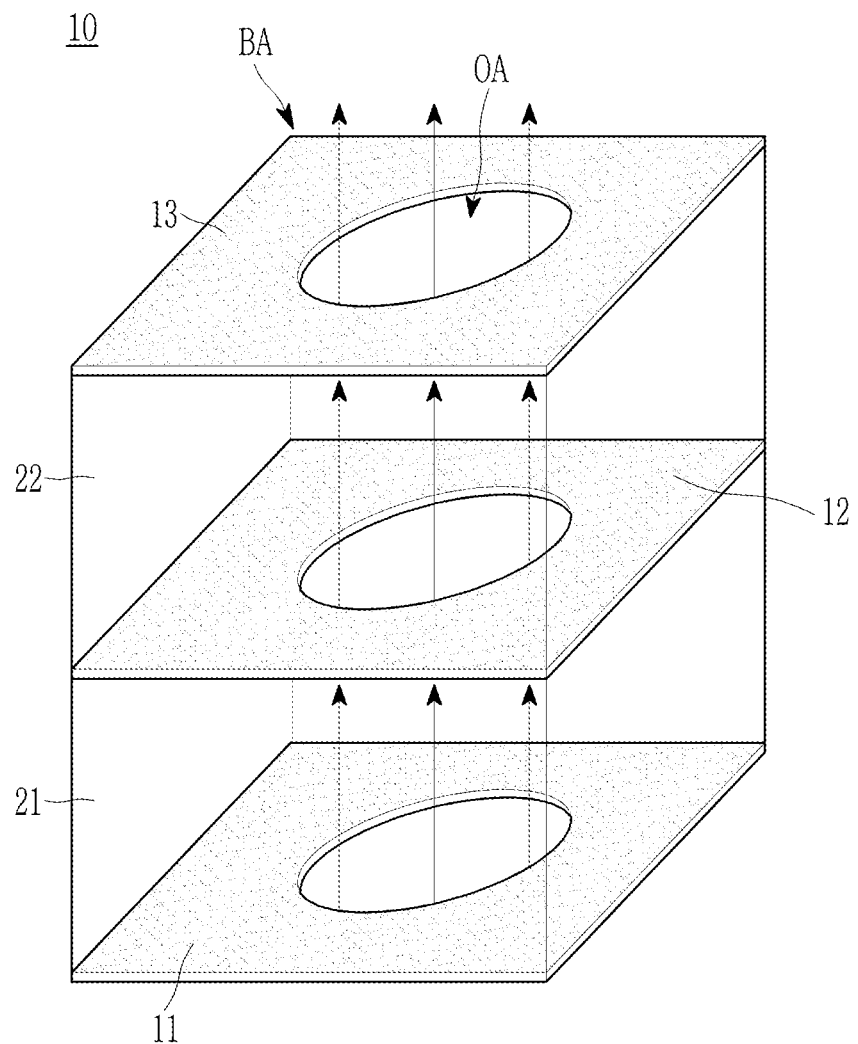
FIG. 1 illustrates an exploded perspective view of a light control film according to an embodiment.

The embodiments will be described more fully hereinafter with reference to the accompanying drawings, in which embodiments of the disclosure are shown. As those skilled in the art would realize, the described embodiments may be modified in various different ways, all without departing from the spirit or scope of the disclosure.

In order to clearly describe the embodiments, parts or portions that are irrelevant to the description are omitted, and identical or similar constituent elements throughout the specification are denoted by the same reference numerals.

Further, in the drawings, the size and thickness of each element are arbitrarily illustrated for ease of description, and the disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a light control film according to an embodiment will be described with reference to FIG. 1 to FIG. 3. FIG. 1 illustrates an exploded perspective view of a light control film according to an embodiment, FIG. 2 illustrates a schematic cross-sectional view of a light control film according to an embodiment, and FIG. 3 illustrates a schematic cross-sectional view of a light absorbing layer of a light control film according to an embodiment.

Figure 2:
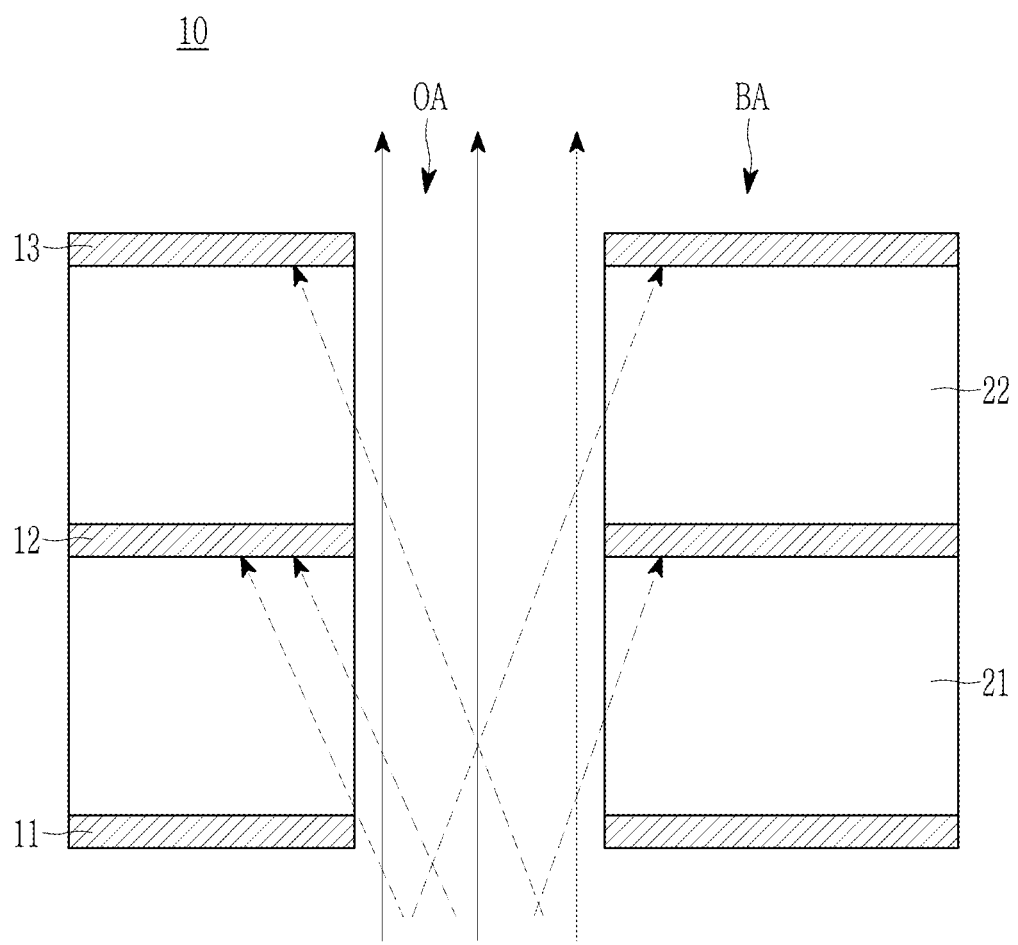
FIG. 2 illustrates a schematic cross-sectional view of a light control film according to an embodiment.
Figure 3:
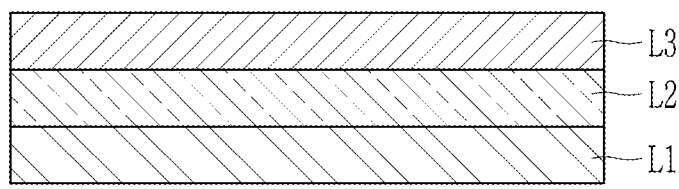
FIG. 3 illustrates a schematic cross-sectional view of a light absorbing layer of a light control film according to an embodiment.

Referring to FIG. 1 and FIG. 2, a light control film 10 according to an embodiment may include a first light absorbing layer 11, a second light absorbing layer 12, and a third light absorbing layer 13. In the specification, an embodiment in which the light control film 10 includes three light absorbing layers 11, 12, and 13 is described, but the disclosure is not limited thereto, and the light control film 10 may include two or more light absorbing layers.

The light control film 10 according to the embodiment may include a first organic layer 21 positioned between the first light absorbing layer 11 and the second light absorbing layer 12, and a second organic layer 22 positioned between the second light absorbing layer 12 and the third light absorbing layer 13. In the specification, an embodiment in which the light control film 10 includes two organic layers 21 and 22 is described, but the disclosure is not limited thereto, and the light control film 10 may have any stacked structure in which an organic layer is disposed between adjacent light absorbing layers. The first organic layer 21 and the second organic layer 22 may include a transparent organic material.

The second light absorbing layer 12 may be positioned on the first light absorbing layer 11, and the third light absorbing layer 13 may be positioned on the second light absorbing layer 12. The first light absorbing layer 11, the second light absorbing layer 12, and the third light absorbing layer 13 may include a same stacked structure and material, but are not limited thereto, and light absorbing layers 11, 12, and 13 may include different materials and different stacked structures. For example, configurations of first to third layers, which will be described later, may be independently applied to each of the light absorbing layers 11, 12, and 13.

Each of the light absorbing layers 11, 12, and 13 may include an opening area OA and a blocking area BA. Among light incident from a side of the light control film 10, light (indicated by arrows shown in solid lines) incident to the opening area OA may be emitted through the light control film 10, and light (indicated by arrows shown in dotted lines) incident to the blocking area BA may be blocked by the light control film 10. Among the light incident to the light control film 10, light emitting in a direction perpendicular to the light absorbing layers 11, 12, and 13 may be mainly emitted.

The first light absorbing layer 11, the second light absorbing layer 12, and the third light absorbing layer 13 may include the opening area OA having a same shape. In the specification, the opening area OA having a circular shape in a plan view is shown, but the disclosure is not limited thereto, and the shape of the opening area OA may be variously changed to a stripe shape, a pixel shape included in a display panel, and the like.

As shown in FIG. 2, each of the first light absorbing layer 11, the second light absorbing layer 12, and the third light absorbing layer 13 may include the opening area OA having the same shape. A width of the opening area OA provided by the first light absorbing layer 11, a width of the opening area OA provided by the second light absorbing layer 12, and a width of the opening area OA provided by the third light absorbing layer 13 may be the same.

Referring to FIG. 3, each of the first light absorbing layer 11, the second light absorbing layer 12, and the third light absorbing layer 13 may include a first layer L1, a second layer L2, and a third layer L3. The first layer L1, the second layer L2, and the third layer L3 may be sequentially stacked. In FIG. 2, the embodiment in which the first light absorbing layer 11, the second light absorbing layer 12, and the third light absorbing layer 13 include the same stacked structure and the same material is illustrated and described, but the disclosure is not limited thereto, and each of the first light absorbing layer 11, the second light absorbing layer 12, and the third light absorbing layer 13 may include stacked structures and materials with different first to third layers L1, L2, and L3.

Each of the first layer L1 and the third layer L3 according to the embodiment may include a metal oxide. The metal oxide may include at least one of copper, molybdenum, and tantalum. The first layer L1 and the third layer L3 according to the embodiment may include a copper oxide, a molybdenum oxide, a tantalum oxide, a molybdenum tantalum oxide, or the like. The second layer L2 may include a metal. For example, the second layer L2 may include at least one of copper, molybdenum, aluminum, and titanium.

According to the embodiment, the first layer L1 may include a copper oxide, the second layer L2 may include copper, and the third layer L3 may include a copper oxide. According to another embodiment, the first layer L1 may include a molybdenum tantalum oxide, the second layer L2 may include molybdenum, aluminum, or titanium, and the third layer L3 may include a molybdenum tantalum oxide.

In case that the first layer L1 and the third layer L3 include a copper oxide, a manufacturing process for forming the opening area OA may use a wet etching process. In case that the first layer L1 and the third layer L3 include a molybdenum tantalum oxide, the manufacturing process for forming the opening area OA may use a dry etching process.

A thickness of the first layer L1 may be greater than or equal to about 450 angstroms, for example, in a range of about 550 angstroms to about 650 angstroms. A thickness of the second layer L2 may be greater than or equal to about 500 angstroms. A thickness of the third layer L3 may be greater than or equal to about 450 angstroms, for example, in a range of about 550 angstroms to about 650 angstroms. In case that the thicknesses of the first layer L1 to the third layer L3 satisfy the above numerical range, light reflection may be effectively reduced.

Absorption coefficients k of the first layer L1 and the third layer L3 may be greater than or equal to about 0.5, for example, greater than or equal to about 0.7. In case that the absorption coefficients k of the first layer L1 and the third layer L3 satisfy the above numerical range, light reflection may be effectively reduced.

Since the light control film 10 according to the embodiment may be manufactured through a simple process, a time and cost required for the process may be significantly reduced. Since each light absorbing layer provides the opening area, the light control film 10 may provide the blocking area BA and the opening area OA in the light control film itself without providing a deep opening passing through the light control film 10.

Figure 4:
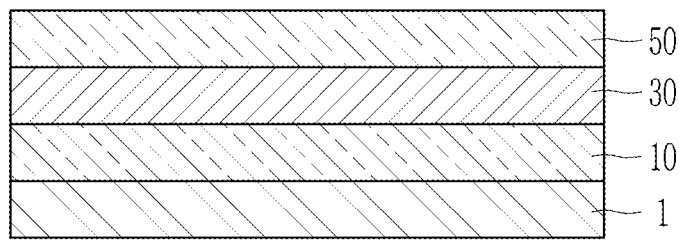
FIG. 4 illustrates a schematic cross-sectional view of a display device according to an embodiment.

Hereinafter, a display device including a light control film according to an embodiment will be described with reference to FIG. 4. FIG. 4 illustrates a schematic cross-sectional view of a display device according to an embodiment.

Referring to FIG. 4, a display device 1000 according to an embodiment may include a display panel 1 including multiple light emitting areas and non-light emitting areas, a light control film 10 positioned on the display panel 1, and an adhesive layer 30 and a window 50 that are positioned on the light control film 10. The adhesive layer 30 may be transparent, and may be an optically clear adhesive (OCA), an optically curable resin (OCR), or an ultraviolet resin.

Light emitted from the light emitting area of the display panel 1 may pass through the light control film 10 and the window 50 to be viewed by a user. Light emitted upward or downward by a predetermined (or selectable) angle or more with respect to a direction perpendicular to the window 50 may be blocked by the blocking area BA included in the light control film 10.

Figure 5:
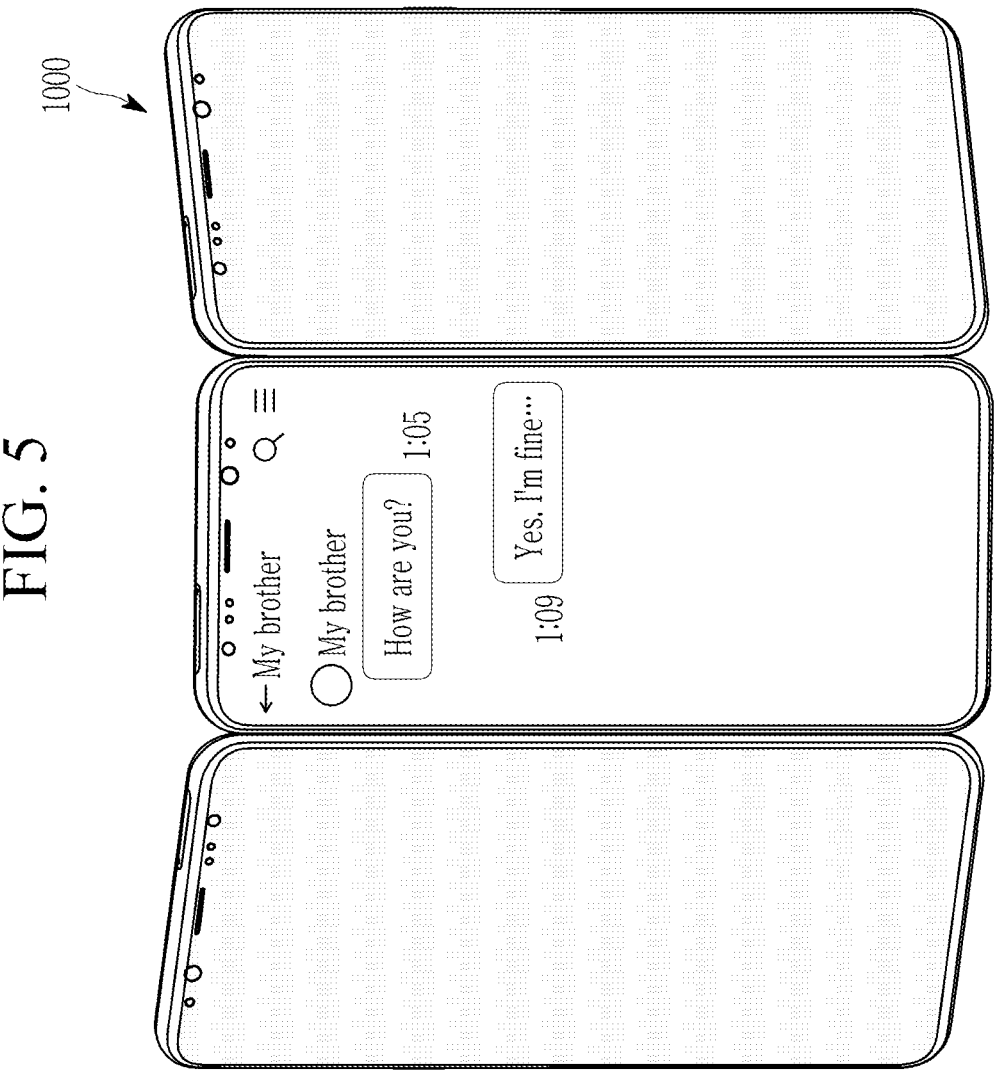
FIG. 5 illustrates a display device according to an embodiment viewed from various angles.

FIG. 5 illustrates a display device according to an embodiment viewed from various angles.

Referring to FIG. 5, the display device 1000 according to the embodiment may have a privacy protection function that protects information displayed on a screen from surrounding people in a public place. An image may be displayed to the user in a direction facing the user, and the image may not be viewed at a certain angle or more.

Figure 6:
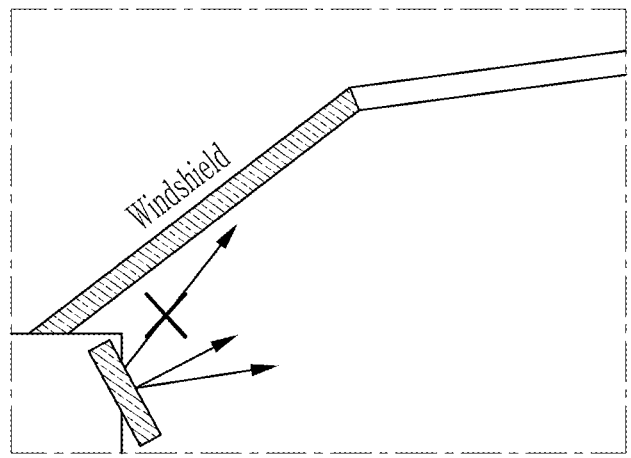
FIG. 6 illustrates a path of light emitted from a display device according to an embodiment.

Hereinafter, light paths according to an example and a comparative example will be described with reference to FIG. 6 and FIG. 7. FIG. 6 illustrates a path of light emitted from a display device according to an embodiment, and FIG. 7 illustrates a path of light emitted from a display device according to a comparative example.

As shown in FIG. 6, in a case of the display device including the light control film 10, light emitted toward a vehicle window (for example, a windshield) may be blocked in the display device. Accordingly, it is possible to prevent the light emitted from the display device from being reflected on the windshield of the vehicle. By blocking the light directed to the windshield for the vehicle, it is possible to prevent a reflective image from occurring and ensure safety or privacy of a driver.

Figure 7:
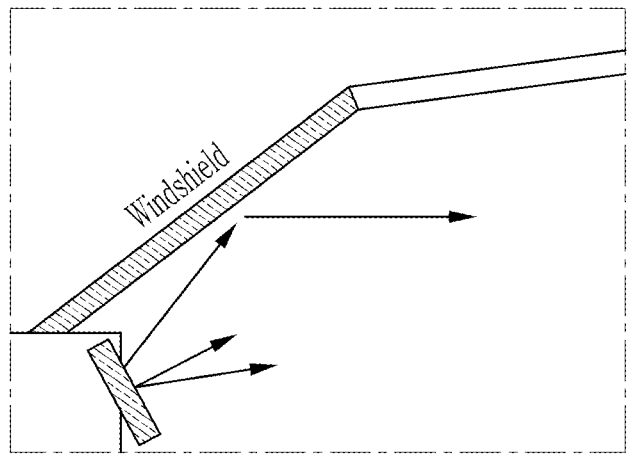
FIG. 7 illustrates a path of light emitted from a display device according to a comparative example.

However, in case that a light control film 10 is not included, as shown in FIG. 7, as the light emitted from the display device is emitted at various angles, some of the light may be emitted toward the windshield of the vehicle, so that it may be viewed by another person as a reflective image.

Figure 8:
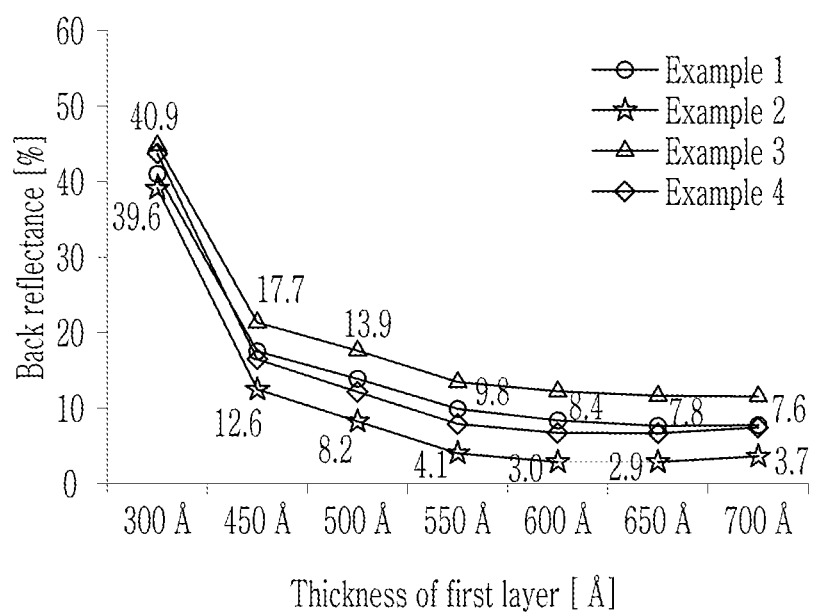
FIG. 8 illustrates a graph of back reflectance according to a thickness of a first layer with respect to a wavelength of 550 nanometers.

Hereinafter, reflectance of an example and a comparative example will be described with reference to FIG. 8 to FIG. 11. FIG. 8 illustrates a graph of back reflectance according to a thickness of a first layer with respect to a wavelength of 550 nanometers, FIG. 9 illustrates a graph of back reflectance of a light control film for each wavelength band, and FIG. 10 and FIG. 11 respectively illustrate a graph of reflectance of a light control film for each wavelength band.

Referring to FIG. 8, Example 1 is an average reflectance of an entire wavelength band excluding 4% of reflectance of a glass substrate, Example 2 is reflectance of a 550 nanometer wavelength band excluding 4% of reflectance of a glass substrate, Example 3 is an average reflectance of an entire wavelength band including reflectance of a glass substrate, and Example 4 is reflectance of a 550 nanometer wavelength band including reflectance of a glass substrate.

Referring to Example 1 to Example 4, it can be seen that as the thickness of the first layer (or the third layer) increases, the back reflectance is significantly reduced. Particularly, it was confirmed that in case that the thickness of the first layer was about 450 angstroms or more, the back reflectance was significantly reduced compared to the case in which the thickness of the first layer was 300 angstroms. Accordingly, the thickness of the first layer (or the third layer) may be provided to be greater than or equal to about 450 angstroms.

Figure 9:
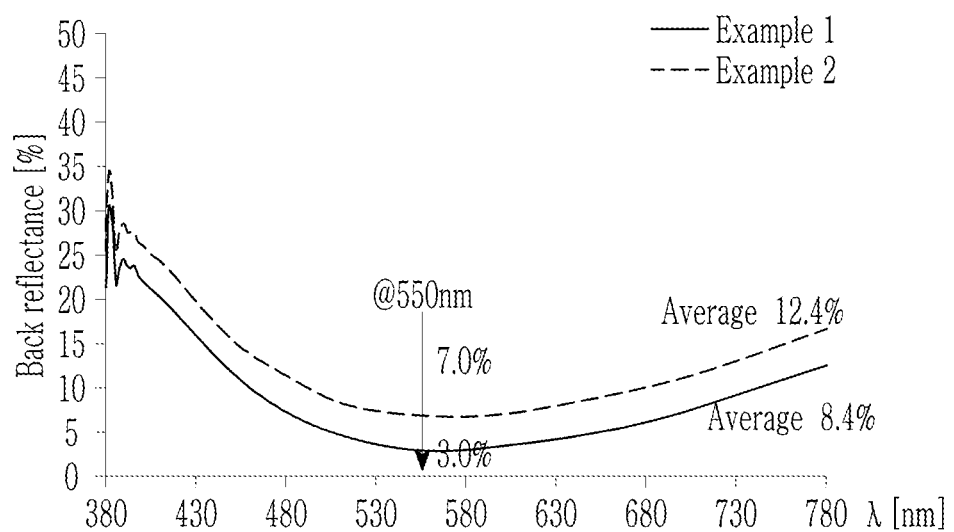
FIG. 9 illustrates a graph of back reflectance of a light control film for each wavelength band.

Referring to FIG. 9, Example 1 is an average reflectance excluding 4% of reflectance of a glass substrate, and Example 2 is reflectance including reflectance of a glass substrate. The back reflectance of Examples 1 and 2 have been measured for each wavelength band. For a wavelength of about 550 nanometers, Example 1 had a reflectance of about 3.0%, and Example 2 had a reflectance of about 7.0%. It was confirmed that Example 1 had an average reflectance of 8.4% and Example 2 had an average reflectance of 12.4%. Through Examples 1 and 2, it was confirmed that the reflectance was significantly reduced in case that the light control film according to the embodiment of the disclosure was included.

Figure 10:
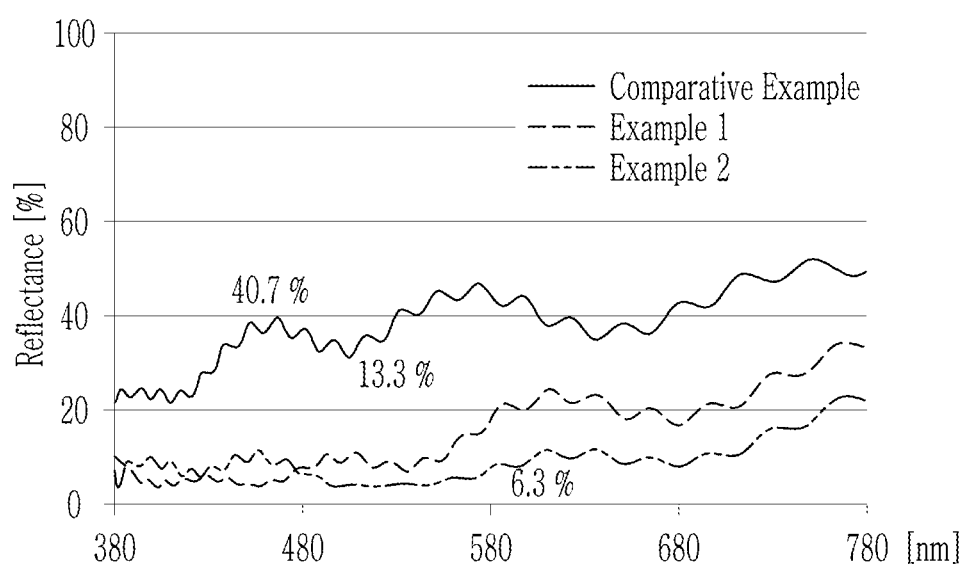
FIG. 10 illustrates a graph of reflectance of a light control film for each wavelength band.

Referring to FIG. 10, a Comparative Example is a case in which the light absorbing layer includes molybdenum, and Example 1 is a case in which the light absorbing layer has a stacked structure of a molybdenum tantalum oxide (hereinafter MTO), molybdenum, and a molybdenum tantalum oxide, and a layer thickness of the MTO is 650 angstroms. Example 2 is a case in which the light absorbing layer has a stacked structure of an MTO, Mo, and an MTO, and a layer thickness of the MTO is 1000 angstroms.

In the case of Examples 1 and 2, it can be seen that Examples 1 and 2 have lower reflectance compared to the Comparative Example with respect to the entire wavelength area. Specifically, the Comparative Example had an average reflectance of 40.7%, Example 1 had an average reflectance of 13.3%, and Example 2 had an average reflectance of 6.3%.

Figure 11:
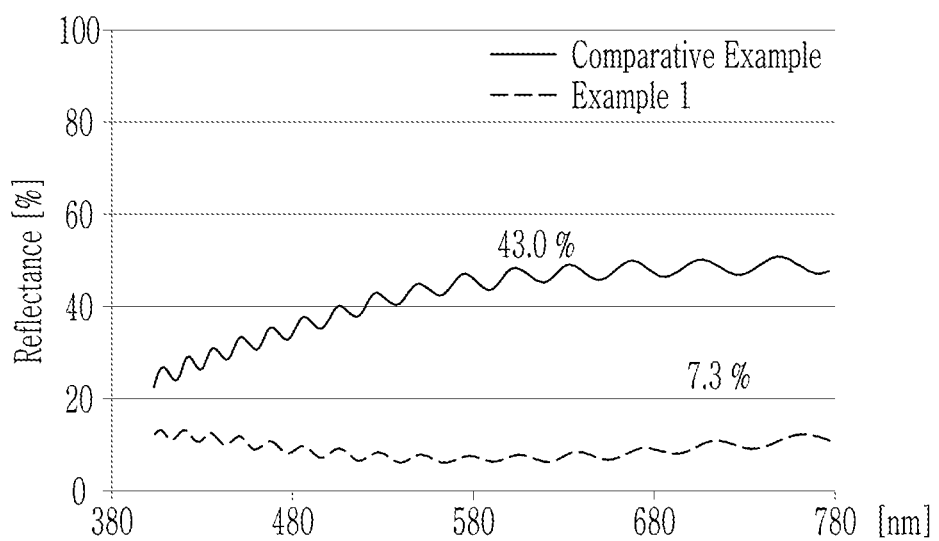
FIG. 11 illustrates a graph of reflectance of a light control film for each wavelength band.

Referring to FIG. 11, the Comparative Example is a case in which a light absorbing layer having a stacked structure of Ti, Al, and Ti, and Example 1 is a case in which a light absorbing layer having a stacked structure of an MTO, Ti, and an MTO. In Example 1, a thickness of the MTO is about 600 angstroms.

It was confirmed that Example 1 had a significantly lower level of reflectance compared to the Comparative Example. Particularly, it was confirmed that the Comparative Example had an average reflectance of 43%, while the Example 1 had an average reflectance of about 7.3%.

The light control film 10 according to the embodiment has a simple stacked structure, and thus the time and cost required for the process may be significantly reduced. Since each light absorbing layer provides the opening area, the light control film 10 may provide the blocking area BA and the opening area OA in the light control film 10 itself without providing a deep opening passing through the light control film 10. The display device according to the embodiment may transmit the remaining light emitted from the light emitting area while blocking light emitted from the display panel at an angle greater than or equal to a predetermined (or selectable) angle, thereby providing a viewing angle required for the display device and improved front direction luminance.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A light control film, comprising:
a first light absorbing layer;
a first organic layer disposed directly on the first light absorbing layer; and
a second light absorbing layer disposed directly on the first organic layer;
a second organic layer disposed directly on the second light absorbing layer; and
a third light absorbing layer disposed directly on the second organic layer, wherein
at least one of the first light absorbing layer and the second light absorbing layer includes:
a first layer including a metal oxide;
a second layer disposed on the first layer and including a metal; and
a third layer disposed on the second layer and including the metal oxide.

2. The light control film of claim 1, wherein the metal oxide includes at least one of copper, molybdenum, and tantalum.

3. The light control film of claim 1, wherein the second layer includes at least one of copper, molybdenum, aluminum, and titanium.

4. The light control film of claim 1, wherein
each of the first layer and the third layer includes a copper oxide, and
the second layer includes copper.

5. The light control film of claim 1, wherein
each of the first layer and the third layer includes a molybdenum tantalum oxide, and
the second layer includes at least one of molybdenum, aluminum, and titanium.

6. The light control film of claim 1, wherein a thickness of each of the first layer and the third layer is greater than or equal to about 450 angstroms.

7. The light control film of claim 6, wherein the thickness of each of the first layer and the third layer is in a range of about 550 angstroms to about 650 angstroms.

8. The light control film of claim 6, wherein a thickness of the second layer is greater than or equal to about 500 angstroms.

9. The light control film of claim 1, wherein an absorption coefficient of each of the first layer and the third layer is greater than or equal to about 0.5.

10. The light control film of claim 9, wherein the absorption coefficient of each of the first layer and the third layer is greater than or equal to about 0.7.

11. The light control film of claim 1, wherein
the first light absorbing layer includes a first opening,
the second light absorbing layer includes a second opening,
the third light absorbing layer includes a third opening, and
the first opening, the second opening, and the third opening overlap each other.

12. The light control film of claim 11, wherein the first opening, the second opening, and the third opening have a same shape.

13. The light control film of claim 11, wherein
light emitted from a light emitting area of a display panel and traveling at an angle less than a predetermined angle with respect to a thickness direction of a display device including the display panel and the light control film transmits through the light control film to be viewed by a user by passing through the first opening, the second opening, and the third opening, and
light emitted from the light emitting area of the display panel and traveling at an angle greater than the predetermined angle with respect to a thickness direction of the display device is blocked by at least one of the first light absorbing layer, the second light absorbing layer, and the third light absorbing layer.

14. The light control film of claim 1, wherein each of the first, second, and third light absorbing layers includes:
a first layer including a metal oxide;
a second layer disposed on the first layer and including a metal; and
a third layer disposed on the second layer and including the metal oxide.

15. A display device comprising:
a display panel; and
a light control film overlapping the display panel in plan view, wherein
the light control film includes:
a first light absorbing layer;
a first organic layer disposed directly on the first light absorbing layer; and
a second light absorbing layer disposed directly on the first organic layer;
a second organic layer disposed directly on the second light absorbing layer; and a third light absorbing layer disposed directly on the second organic layer, wherein
at least one of the first light absorbing layer and the second light absorbing layer includes:
a first layer including a metal oxide;
a second layer disposed over the first layer and including a metal; and
a third layer disposed over the second layer and including the metal oxide.

16. The display device of claim 15, wherein the metal oxide includes at least one of copper, molybdenum, and tantalum.

17. The display device of claim 15, wherein the second layer includes at least one of copper, molybdenum, aluminum, and titanium.

18. The display device of claim 15, wherein
each of the first layer and the third layer includes a copper oxide, and
the second layer includes copper.

19. The display device of claim 15, wherein
each of the first layer and the third layer includes a molybdenum tantalum oxide, and
the second layer includes at least one of molybdenum, aluminum, and titanium.

20. The display device of claim 15, wherein a thickness of each of the first layer and the third layer is greater than or equal to about 450 angstroms.

21. The display device of claim 20, wherein a thickness of the second layer is greater than or equal to about 500 angstroms.

22. The display device of claim 21, wherein an absorption coefficient of each of the first layer and the third layer is greater than or equal to about 0.5.

23. The display device of claim 15, wherein
light emitted from a light emitting area of the display panel and traveling at an angle less than a predetermined angle with respect to a thickness direction of the display device transmits through the light control film to be viewed by a user, and
light emitted from the light emitting area of the display panel and traveling at an angle greater than the predetermined angle with respect to a thickness direction of the display device is blocked by the light control film.

* * * * *